United States Patent

Holloway

[15] 3,647,197

[45] Mar. 7, 1972

[54] VACUUM DEPOSITION

[72] Inventor: Henry Holloway, West Bloomfield Township, Mich.

[73] Assignee: Ford Motor Company, Dearborn, Mich.

[22] Filed: Apr. 27, 1970

[21] Appl. No.: 31,984

[52] U.S. Cl. ....................263/47 R, 263/11

[51] Int. Cl. ....................F27b 14/04

[58] Field of Search....................263/47 R, 47 A, 48, 11, 14

[56] References Cited

UNITED STATES PATENTS 3,491,992 1/1970 Reichelt....................263/48

2,383,353 8/1945 Steele....................263/11

2,773,923 12/1956 Smith....................263/48

*Primary Examiner*—John J. Camby

*Attorney*—John R. Faulkner and Thomas H. Oster

[57] ABSTRACT

This invention is concerned with an apparatus for depositing in vacuum an epitaxial layer of lead tin tellurides. This invention achieves a constant chemistry of the deposited film by evaporating the constituents of the film from an essentially integral and isothermal source.

1 Claims, 1 Drawing Figure

PATENTED MAR 7 1972
3,647,197
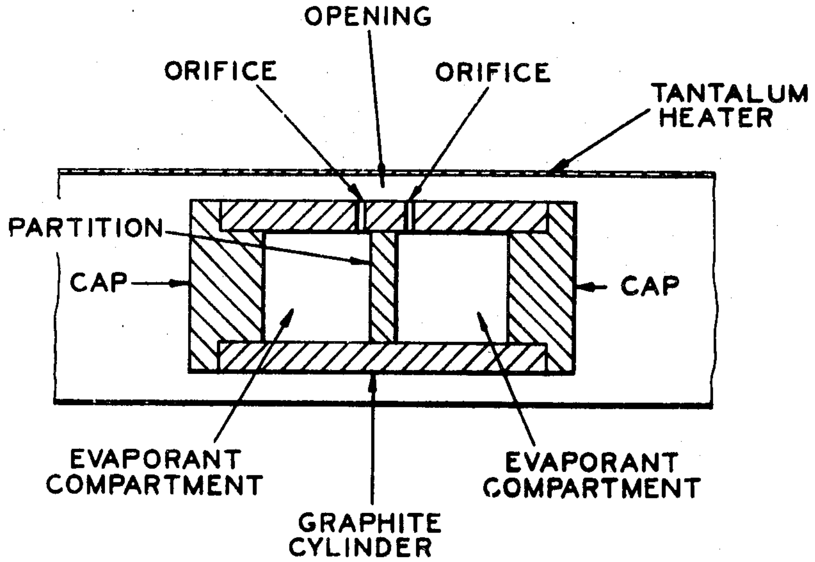
*INVENTOR.*
HENRY HOLLOWAY
*BY*
John R. Faulkner
Thomas H. Oster
ATTORNEYS

VACUUM DEPOSITION

BACKGROUND

Alloy films of lead tin telluride have been investigated intensively recently with particular attention to their photovoltaic properties. Special attention has been paid to their possible use as detectors of infrared radiation in the vicinity of 10 microns. This particular radiation band corresponds to the output of carbon dioxide lasers and to a "window" in the atmosphere. At this particular band, radiation is not attenuated significantly by water vapor which is always present in the atmosphere.

The exploration of these lead tin tellurides is quite recent and for the benefit of those who may not be familiar with the genesis of this art, the following brief bibliography is made of record.

Alloy Film of $PbTe_x Se_1{}^-{}_x$
Bis —and Zemel Journal of Applied
Physics Vol. 37 No. 1 Jan. 1966
Pages 228 to 230.
Reproducible Preparation of $Sn_1{}^-{}_xPb_xTe$
Film with Moderate Carrier
Concentrations
Bylander Materials Science and Engineering
1, 1966 Pages 190 to 194.
Photovoltaic Effect in $Pb_xSn_1{}^-{}_xTe$ Diodes
Melngailis and Calawa
Applied Physics Letters Vol. 9 No. 8
Oct. 15, 1966 Pages 304 to 306.
Photoconductivity in Single-Crystal $Pb_1{}^-{}_xSn_xTe$
Melngailis and Harman Applied Physics
Letters Volume 13, No. 5 Sept. 1968
Pages 180 to 183.
Journal of Vacuum Science Technology 6
Pages 917, 918.

These epitaxial lead tin telluride films are usually prepared by evaporation in a vacuum as clearly taught by the Bis and Zemel publication. This evaporation technique is well known. These epitaxial films are usually deposited upon a substrate of suitable crystallography. Alkali metal halides such as sodium chloride and potassium chloride are commonly employed as such substrates.

THE INVENTION

The superior results obtained by the practice of this invention are due to the use of a unique integral evaporating device which is ideally suited for isothermal operation. This device is best understood by reference to the FIGURE of the drawing which is a schematic cross section of the evaporating device employed to produce the epitaxial layer of lead tin telluride with an essentially constant and predictable composition.

The production of the epitaxial lead tin telluride layer requires that the ingredients of the layer be contained in a vacuum chamber and heated to a definite temperature.

The ratio of the components of the layer is strongly influenced by changes in the temperature of the evaporants. Such changes during the deposition process give rise to undesirable homogeneities in the layer.

The structure shown in the FIGURE of the drawing is designed to contain two evaporants during the actual formation of the film. This structure is basically a one-piece graphite cylinder divided into two adjacent compartments. This division is accomplished by an integral partition between the two adjacent compartments. The open ends of these graphite cylinders are closed by graphite caps. A pair of evaporant compartments are thus formed. This graphite structure is heated by an electrically energized tantalum heater in the form of a cylinder about ten-thousandths of an inch thick. Each evaporant compartment is provided with an orifice for the escape of the gaseous evaporant. Evaporant flowing through these orifices pass through the opening in the tantalum heater and to the substrate to be coated.

The high thermal conductivity of the graphite and the close proximity of the two evaporants assures a constant ratio of evaporants in the effluent from the evaporating apparatus. The necessarily isothermal operation of this apparatus requires a regulation of the ratio of evaporants to the correct value by adjustment of the size of the orifices through which the evaporants escape. The more volatile evaporant would, of course, escape through a smaller orifice.

Depositions were carried out in an oil-free vacuum system with bell-jar pressures in the range $2\times10^{-7}$ -$1\times10^{-6}$ torr. The substrates were single crystals of $BaF_2$. These were cleaved in air immediately before use and then heated in vacuum to 360° C. For some experiments the sources were commercially available polycrystalline PbTe and SnTe, for others the compounds were synthesized from stoichiometric melts of the elements (nominally 99,999 percent pure). The results reported here do not depend significantly upon the origin of the compounds. PbTe and SnTe were evaporated from Knudsen cells that had been made in a single rod of spectroscopically pure graphite. The double cell was operated at 700° C. by heating with a coaxial tantalum cylinder. With this arrangement temperature fluctuations in the two cells tend to occur in phase and fluctuations in layer composition are greatly reduced.

The requirements for epitaxy of $Pb_{0.8}Sn_{0.2}$ Te upon cleaved $BaF_2$ are not fully characterized. The following general comments may be made. With substrates at 250° C., epitaxy was sometimes achieved, but the results were poorly reproducible. X-ray studies showed that many of these layers had a (100) orientation (corresponding to the preferred cleavage of their rock-salt structure) instead of the (111) orientation expected for epitaxy on cleaved $BaF_2$. Glancing-angle electron diffraction patterns had arced rings, which indicated that the (100) deposits were approximately fiber textured. Increased substrate temperatures gave, more reproducibly, layers with only (111) planes parallel to the $BaF_2$ surface. Electron diffraction patterns showed that some of these specimens contained a second, twin, orientation, which was related to that of the substrate by rotation through $\pi$ about the face-normal.

Most of the layers described here were grown at 325° C. and appear to contain only a single (111) orientation. (Their electron diffraction patterns show Kikuchi lines and little else). However, even at this substrate temperature, growth is erratic to the extent that both the (100) texture and the mixture of (111) orientations are sometimes obtained. This behavior suggests that the deposit substrate interactions may be barely adequate to overcome a tendency for nuclei of lead tin telluride to adopt a habit bounded by (100) planes. (In this context it is worth noting that layers grown at 325° C. on vitreous silica are found to have only (100) planes parallel to the substrate surface).

The resistivities ($\rho$) and Hall coefficients ($R_H$) were measured with the van der Pauw method using indium contacts. The results for specimens with areas about 0.2 cm.$^2$ were independent of current in the range 10–200 $\mu$A. and of magnetic ·d in the range 1–4 kg. The mobilities and carrier concentrations cited here are defined from $\mu=R_H/p$ and that $R_H=-1/ne$.

Table I gives results obtained at 300° K. and 77° K. The data are representative of the observed ranges of carrier concentration and mobility. In this case the values are for n- and P-type layers with about the largest mobilities that have been observed.

Preliminary analyses of electrical properties give the following results.

i. Epitaxy appears to be necessary for large mobilities at 77° K. Thus, specimen number 74 with a (100) texture has a small mobility. The electrical and diffraction results for this layer qualitatively resemble those for a layer on vitreous silica and also those reported by Farinre and Semel for layers grown on $CaF_2$. However, the correlation is imperfect: specimen number 76, with a large hole mobility, contained a mixture of the (111) and (100) orientations.

ii. With decrease in temperature the Hall coefficients of n-type layers decrease. These effects appear to be generally similar to those observed previously in bulk and thin-film specimens of lead and tin chalcogenides.

iii. At higher temperatures the mobilities vary as $T^{-c}$ with $c \approx 5/2$. The n-type specimen (71) gives $c$=2.4 and the p-type (80) gives $c$=2.5. Measurements of two other p-type specimens (76 and 77) also give $c$=2.5. Similar results have been obtained previously and interpreted in terms of acoustic phonon scattering with a temperature-dependent effective mass. As observed before with lead and tin chalcogenides, the mobilities tend to saturate at lower temperatures. While we cannot eliminate the possibility that there is impurity scattering, it is of interest to apply an analysis similar to that used by Zemel et al. for layers of lead telluride. Fitting the data to the relationship $1/\mu^{(T)}=1/AT^{-2.5}=1/\mu_R$, the n- and p-type layers yield values of $\mu_R$ that are essentially temperature-independent and equal to 36,000 and 25,000 cm.$^2$V.$^{-1}$ sec.$^{-1}$ respectively. If these residual mobilities are assumed to arise from scattering of a degenerate electron (or hole) gas, both the n- and p-type layers are found to have a limiting carrier mean-free path of about 0.5 $\mu$m. This distance may be interpreted as a lower limit for the mean grain size in the epitaxial layers with the largest mobilities.

TABLE I.—ELECTRICAL PROPERTIES OF LEAD TELLURIDE LAYERS

| Specimen number | Mole fraction SnTe [a] | Substrate temperature (° C.) | Thickness ($\mu$m) | Type | Carrier concentration (cm.$^{-3}$) 300° K. | Carrier concentration (cm.$^{-3}$) 77° K. | Hall mobility (cm.$^2$V.$^{-1}$ sec.$^1$) 300° K. | Hall mobility (cm.$^2$V.$^{-1}$ sec.$^1$) 77° K. |
|---|---|---|---|---|---|---|---|---|
| 74 [b] | 0.171 | 250 | 3.9 | N | $1.9\times10^{18}$ | $1.75\times10^{18}$ | 600 | 1,900 |
| 78 | 0.190 | 325 | 2.3 | N | $1.85\times10^{17}$ | $1.2\times10^{17}$ | 1,140 | 11,200 |
| 71 | 0.212 | 250 | 2.7 | N | $4.9\times10^{17}$ | $3.4\times10^{17}$ | 1,100 | 17,200 |
| 87 | 0.218 | 325 | 0.9 | N | $4.0\times10^{17}$ | $2.4\times10^{17}$ | 790 | 11,900 |
| 76 [c] | 0.177 | 275 | 2.5 | P | $4.4\times10^{17}$ | $4.9\times10^{17}$ | 680 | 12,400 |
| 81 | 0.183 | 325 | 1.3 | P | $3.9\times10^{17}$ | $3.9\times10^{17}$ | 640 | 7,300 |
| 83 | 0.192 | 325 | 1.2 | P | $1.7\times10^{18}$ | $1.9\times10^{19}$ | 600 | 6,300 |
| 88 | 0.196 | 325 | 1.0 | P | $9.4\times10^{17}$ | $1.3\times10^{18}$ | 560 | 6,600 |
| 80 | 0.198 | 325 | 1.9 | P | $6.8\times10^{17}$ | $8.0\times10^{17}$ | 700 | 11,800 |
| 77 [c] | 0.215 | 300 | 2.1 | P | $9.4\times10^{17}$ | $9.7\times10^{17}$ | 500 | 7,100 |
| 84 | 0.215 | 325 | 1.3 | P | $7.7\times10^{17}$ | $9.9\times10^{17}$ | 680 | 8,200 |
| 86 | 0.236 | 325 | 0.9 | P | $1.7\times10^{18}$ | $2.2\times10^{19}$ | 700 | 6,300 |

[a] This is the value that corresponds to the Bragg maxima. There is a small variation that is discussed in the text.
[b] This layer had a (100) fiber texture.
[c] These layers contained mixtures of the (100) and (111) orientations.

This invention has been described particularly in connection with the epitaxial films based upon lead tin tellurides. However, it is by no means so limited and includes the deposition of the chalcogenides of Group 6 with the metals of Group 4.

Graphite has been disclosed as the preferred material of construction for the containers for the evaporants. The invention is by no means so limited. The only requirements are that the material be nonvolatile under operating conditions, be chemically inert to the evaporants and have a suitable combination of mass and thermal conductivity to attain substantially isothermal operating conditions. It is understood that materials of high conductivity may have less mass than those of low thermal conductivity and still attain isothermal operation. In addition to graphite, suitable materials for the container include other forms of carbon, boron nitride, copper, aluminum, silver, gold anu platinum.

I claim as my invention:

1. A device for the containment of a plurality of evaporants during vacuum evaporation comprising an integral container fabricated from a material nonvolatile at evaporating temperatures, inert to the intended evaporants and sufficiently massive in cross section to insure substantially isothermal operation, separate compartments within the containment device for the reception and evaporation of individual evaporants, each of said separate compartments being effectively closed except for a restricting orifice for regulating the flow of evaporant from that said separate compartment, the ratio of the flow of the different evaporants being controlled by the ratio of the size of the orifices.

* * * * *